United States Patent Office 2,721,850
Patented Oct. 25, 1955

2,721,850

CELLULOSE ESTERS PLASTICIZED WITH A CONDENSATION POLYMER

Philip Richard Hawtin and John Alec John, Spondon, near Derby, England, assignors to British Celanese Limited, a company of Great Britain No Drawing. Application November 30, 1951, Serial No. 259,315

Claims priority, application Great Britain December 5, 1950

2 Claims. (Cl. 260—16)

This invention relates to plasticisers and compositions and in particular to plasticisers for celulose derivatives and to compositions containing such derivatives and plasticisers.

We have found that cellulose acetate can be plasticised by condensation polymers of ethylene glycol and of phthalic acid, to yield compositions of high clarity from which there is little tendency to loss of plasticiser by evaporation, even at high temperatures, or by migration into other compositions with which the plasticised cellulose acetate is likely to be brought into contact in use. This is a valuable and unusual combination of properties.

The compositions of the invention, therefore, comprise an ester or ether of cellulose plasticised with the aid of a condensation polymer of ethylene glycol and phthalic acid. Preferably the condensation polymer contains a predominating molar proportion of the glycol residue.

The term "condensation polymers of ethylene glycol and phthalic acid" is used not to connote that the polymers are made from these two components as such, but that they contain alternating residues of the two components. The structure of each of their molecules can be represented by the formula:

$$H[OCOC_6H_4CO]_x[OC_2H_4]_yOH$$

where $x$ and $y$ are positive integers, $y$ being preferably greater than $x$. They are composed of molecules of varying lengths and the above formula also represents the composition of any particular sample, but in this case $x$ and $y$ are not necessarily integers.

The polymers can be made, for example by reaction between ethylene glycol and phthalic anhydride or phthalyl chloride, or by an ester-exchange polycondensation between the glycol and an ester of phthalic anhydride e. g. dimethyl phthalate.

The physical properties of the polymers depend upon the extent to which condensation has been carried, i. e. upon the average molecular weight. For the purpose of the present invention it is preferred to employ polymers in which condensation has not been carried sufficiently far to yield a hard, solid material. The polymers used are preferably highly viscous liquids. These liquid polymers are thought to be new products, although solid, resinous polymers of phthalic anhydride with ethylene glycol have been described by W. H. Carothers ("High Polymers," Inter-Science Publications Inc. 1940, vol. I, pp. 26 and 27). In making these solid, resinous polymers the phthalic anhydride and ethylene glycol were heated together for 8 hours at 190° under ordinary pressure followed by 3 hours at 300° under 3 mm. pressure. In this way polymers of average molecular weight (as determined cryoscopically) of between 1800 and 5000 were obtained. By polycondensation between phthalyl chloride and glycol using pyridine as condensing agent and chloroform as reaction medium, polymers of molecular weight about 1600 were obtained. For the purpose of the present invention we prefer to heat phthalic anhydride and glycol at a temperature no higher than 260° C. and for a period no longer than 8 hours under atmospheric pressure. The glycol should preferably be present in considerable molar excess compared with the phthalic anhydride or equivalent phthalyl compound. These constituents may for instance be present in molar ratios between 1.5:1 and 2.5:1 e. g. about 2:1, provision being made for distilling off excess glycol. In this way polymers have been obtained of average molecular weight (determined chemically as described below), between 500 and 800. These polymers have been found to be excellent plasticisers for cellulose acetate. Products of higher average molecular weight may be made by continuing the polymerisation further, for example by continuing the heating of the reaction mixture at a higher temperature and/or under reduced pressure. In this way useful products of average molecular weight between 800 and 1500, for example 1000, have been obtained. The average molecular weight may be still higher but a very high molecular weight is unnecessary and may introduce difficulties in the incorporation of the plasticiser with the cellulose acetate. It is generally preferable for the average molecular weight to lie between 500 and 1500.

The average molecular weight is determined chemically from the acid-equivalent and the ester-equivalent. The acid-equivalent determined by titration against caustic alkali is the weight of the polymer in grams that contains one equivalent of free acid. Using the formula:

$$H[OCOC_6H_4CO]_x[OC_2H_4]_yOH$$

$$A=\frac{M}{x-y+1}$$

where $A$ is the acid-equivalent and $M$ is the average molecular weight. The ester-equivalent is the weight in grams of polymer that contains one ester group:

$$-C_6H_4COOC_2H_4-$$

This is found by hydrolysing the polymer completely by means of caustic alkali and subtracting the amount of alkali used in neutralising the free acid to obtain the amount used in hydrolysing the ester. Using again the formula referred to above:

$$E=\frac{M}{x+y-1}$$

where $E$ is the ester-equivalent. Also, $M=148x+44y+18$. From these three equations $x$, $y$ and $M$ can be found. All the average molecular weights referred to herein were determined in this way.

The polymers may, as indicated above, be made by reaction between phthalic anhydride and ethylene glycol. Other methods, however, are available, thus for example, instead of phthalic anhydride phthalyl chloride may be used as the esterifying agent. The polymers may also be made by ester-interchange, for instance, from dimethyl phthalate and ethylene glycol.

According to a modification of the invention as described, the acid radicle of the condensation polymer may be 1,2,5,6-tetrahydrophthalic acid instead of phthalic acid. Thus by reacting ethylene glycol with the anhydride or acid chloride of the tetrahydrophthalic acid or with esters thereof a similar series of condensation polymers to those described above may be made, and their polymers may be used in the same way as those described above.

The following examples illustrate the invention:

*Example 1*

Ethylene glycol and phthalic anhydride in molar proportions of 2:1 were heated under atmospheric pressure to 260° C. in a vessel provided with a condenser and maintained at that temperature for 8 hours. During this period glycol accompanied by a small proportion of phthalic acid distilled over. The residue was boiled with water until the washings were neutral, dried at 120° C., dissolved in chloroform, filtered, and the product recovered by evaporation of the chloroform. The product had the following characteristics:

Colour: Clear, brownish yellow
Free acid: 0.0214 equivalents/100 gms.
Ester-equivalent: 106
Viscosity at 20° C. in 20% solution in chloroform: 1.56 centistokes The ester equivalent was determined by refluxing a sample of the product with excess of normal caustic soda for 12 hours and back-titrating. From the value obtained the average molecular weight was calculated to be approximately 700.

*Example 2*

Ethylene glycol and dimethyl phthalate in molar proportions of 2:1 were heated for 9 hours under atmospheric pressure at 190° C. followed by 3 hours at 250° C. under a pressure of 2 mm. The product was washed with water until neutral, dried at 120° C. and dissolved in chloroform which was then evaporated to obtain the product. This was a pale yellow syrup of ester-equivalent 110, containing 0.0055 equivalents of acid per 100 gms. and having a viscosity in 20% solution in chloroform at 20° C. of 1.25 centistokes. The average molecular weight was calculated to be approximately 500.

*Example 3*

The process was as described in Example 2 except that the reaction mixture was heated at 190° C. under a pressure of 100 mm. in an atmosphere of nitrogen and in the presence of 0.5 gm. per mole of potassium carbonate, until methanol ceased to distil. The product was very similar to that of Example 2.

*Example 4*

30 parts by weight of the product of Example 1 together with 100 parts by weight of cellulose acetate of film-forming grade having an acetyl value calculated as acetic acid of 52 to 54% were dissolved in 500 parts of acetone. A film was cast of thickness 0.02"–0.03" by flowing the solution on to a film-forming surface and evaporating the acetone. The film was of high clarity and of tenacity 755 kg./sq. cm. and extension 7%.

In Example 1 the phthalic anhydride can be replaced by 1,2,5,6-tetrahydrophthalic anhydride; in Example 3 the dimethyl phthalate can be replaced by dimethyl 1,2,5,6-tetrahydrophthalate; and in Example 4 the polyethylene phthalate used as plasticiser may be replaced by the corresponding 1,2,5,6-tetrahydrophthalate.

The plasticisers of the invention are of special value in making films (including foils) of high tenacity and low extension. These plasticisers may also be used in making any other kinds of cellulose acetate product, for example in making sheets by the block process, in making moulding compositions, and in formulating cellulose acetate lacquers for use as protective coatings. The introduction of the plasticiser into the cellulose acetate composition can be carried out by various methods. Thus, e. g. in making a moulding composition the plasticiser and cellulose acetate may be mixed with a volatile solvent for both, to form a solid solution from which the volatile solvent is then evaporated, or the plasticiser and cellulose acetate may be dissolved in a hot liquid which is not a solvent at ordinary temperature, for example ethanol, the solution being then cooled until precipitation occurs after which the volatile liquid is evaporated, or hot mixing or milling methods avoiding the use of volatile liquids may be adopted.

The proportion of the polymeric plasticiser to the cellulose acetate may range from below 30%, for example 20%, to over 50%, for example 60–80%, these percentages being based on the weight of the cellulose acetate. Other plasticisers may be employed in admixture with the polymeric plasticisers of the invention. Thus for example, should a higher degree of softness than is imparted by the polymeric plasticiser be desired, the polymeric plasticiser may be used in admixture with a more mobile plasticiser of high solvent power such, for example, as dimethyl phthalate or triacetin, and when improved fire-resistance is called for a proportion of a phosphate plasticiser, for example triphenyl phosphate or trichlorethyl phosphate, may be incorporated. The invention includes the use of the polymeric plasticiser with any other plasticiser for the cellulose acetate. From the moulding compositions of the invention articles may be made by compression moulding, injection moulding, transfer moulding and extrusion.

The plasticisers of the invention are particularly useful with cellulose acetates of acetyl value between 52 and 54% (calculated as acetic acid). They can however be used with cellulose acetates of acetyl value outside this range, for instance of acetyl value 54% to 56% or even higher.

The invention has been described with particular reference to the plasticisation of cellulose acetate. The polymeric plasticisers of the invention may, however, be used as plasticisers for other cellulose esters derived from carboxylic acids containing 2 to 4 carbon atoms, e. g. cellulose propionate, cellulose butyrate, cellulose acetate-propionate and cellulose acetate-butyrate.

Having described our invention, what we desire to secure by Letters Patent is:

1. A composition having a basis of cellulose acetate of acetyl value (expressed as acetic acid) 52 to 56%, plasticized with the sole aid of a liquid plasticizer which is a condensation polymer of ethylene glycol and a substance selected from the class consisting of phthalic acid and 1,2,5,6-tetrahydrophthalic acid, said plasticizer containing a predominating molar proportion of glycol residue and having an average molecular weight, determined chemically, of 500 to 1500, said plasticizer being present to the extent of 20 to 80% by weight based on the weight of the cellulose acetate.

2. A composition having a basis of cellulose acetate of acetyl value (expressed as acetic acid) 52 to 54%, plasticized with the sole aid of a liquid plasticizer which is a condensation polymer of ethylene glycol and phthalic acid, said plasticizer containing a predominating molar proportion of glycol residue and having an average molecular weight, determined chemically, of 500 to 700, the viscosity of a 20% (by weight) solution of the condensation polymer in chloroform at 20° C. being between 1 and 2 centistokes, said plasticizer being present to the extent of 20 to 80% by weight based on the weight of the cellulose acetate.

References Cited in the file of this patent

UNITED STATES PATENTS

| Number | Name | Date |
|---|---|---|
| 1,946,205 | Gabriel | Feb. 6, 1934 |
| 1,950,468 | Zwilgmeyer | Mar. 13, 1934 |
| 2,020,247 | Irey | Nov. 5, 1935 |
| 2,033,281 | Gabriel | Mar. 10, 1936 |
| 2,089,181 | Bradley | Aug. 10, 1937 |
| 2,130,238 | Humphries | Sept. 13, 1938 |
| 2,518,283 | Casassa | Aug. 8, 1950 |